Patented Nov. 12, 1940

2,221,490

UNITED STATES PATENT OFFICE 2,221,490

RECLAIMED RUBBER AND METHOD OF PRODUCING THE SAME

Thomas Robinson, Smithtown, N. Y., assignor to Lancaster Processes Inc., New York, N. Y., a corporation of New York No Drawing. Application October 30, 1937, Serial No. 172,048

6 Claims. (Cl. 260—720)

This invention relates to the reclamation of rubber and is concerned more particularly with a novel method by which vulcanized rubber waste or scrap, including that containing fibrous material, can be readily converted to a form suitable for processing and compounding treatments and for revulcanization. By the practice of the new method, the rubber is homogenized and plasticized but without degradation, and in those scrap materials containing fibres, the latter are not injured either by heat or chemical action. The invention further comprehends a novel reclaimed rubber product containing disintegrated fibrous material distributed substantially uniformly and homogeneously therethrough.

In the reclaiming of rubber as heretofore carried on, vulcanized scrap is usually treated with alkalis under conditions of high temperature and pressure for periods of, for example, from five to thirty hours, for the purpose of removing the excess of free sulphur present. Such treatment results in serious degradation of the quality of the rubber as a result of disaggregation or depolymerization as well as of substantial oxidation. In the case of fibre-bearing rubber, such as scrap from hose, shoes, tire carcasses, etc., it has been the common practice to destroy the fibre by treatment with acid, which also injures the quality of the rubber. More recently, methods of treating such scrap have been devised, according to which destruction of the fibre is avoided, and the rubber is devulcanized by the use of steam, but such treatment requires the use of such high temperatures that the quality of the rubber is degraded and the fibre is frequently charred.

The present invention is, accordingly, directed to the provision of a method for reclaiming rubber which avoids the disadvantages of the methods heretofore used and produces a product, the quality of which has not been degraded. When the new method is employed in the treatment of fibre-bearing scrap, the fibres are disintegrated and thoroughly distributed through the rubber mass, so that a new product is produced to which the fibres contribute valuable characteristics. In the treatment, the fibres are not charred or chemically attacked, and the residual fibres, accordingly, act as a strengthening and reinforcing means for the reclaimed rubber to such an extent that it can be frequently employed for special industrial applications without revulcanization, although the rubber may be revulcanized if desired.

According to the invention, the pieces of scrap or waste to be reclaimed, either containing fibres or not, are introduced into a disintegrating apparatus in which the mass under treatment is confined under mechanical pressure with the pieces in close contact. In the apparatus, the pieces are preliminarily subjected to rolling and crushing operations and are rubbed both along the walls of the chamber in which the operations are performed, and against one another. As a result of these operations, the scrap is disintegrated and heat is generated, usually with the formation of steam from any moisture content in the scrap, the steam escaping freely from the chamber. The rise in temperature of the mass is limited, however, so that overheating of the material is avoided. Preferably, the temperature of the mass is prevented from exceeding approximately 300° F., although this upper limit is not critical and will vary somewhat with the nature of the material undergoing treatment.

As the disintegration proceeds, the pieces of scrap cohere, and if fibrous material is present, it is broken down into small fibres which are distributed through the mass. The operations cause the mass to be plasticized and softened, and the physical structure of the pieces resulting from vulcanization is broken down, with the result that a soft plastic mass is produced which can be further refined in a mill. If desired, the plasticization can be accelerated by the addition to the charge of a suitable plasticising agent, that is, a material such as asphalt, pine oil, etc., which wets and tends to soften the rubber, this material being added in relatively small amounts, such, for example, as 2% to 20% by weight of the mass undergoing treatment.

In accordance with the preferred method, the disintegrating apparatus, prior to or during initial treatment of the material, is heated in any suitable manner, as for example, by applying heat to the walls and working elements thereof. For most grades of scrap rubber, an initial temperature in the apparatus of approximately 210° F. is sufficient. The material is then worked in the manner described for a relatively short period of time, for example 8 minutes, and as a result the pieces of scrap are broken down into small, loose particles of rubber which are somewhat tacky, and relatively short, loose fibre bundles. At this point, the asphalt or other plasticizing agent may be added, although the plasticiser is not necessary. After the rubber scrap has been initially treated in this manner it is subjected to further treatment in the apparatus for another relatively short period of time, for example 30 minutes, and in the latter treatment the particles of rubber are thoroughly mixed and masticated and are caused to cohere in a soft plastic mass. During this treatment, the temperature of the mass rises considerably, due primarily to the friction between the working parts of the apparatus and the material and the rubbing of the particles of rubber on each other, and in order to control the temperature and prevent scorching or degradation of the rubber and charring of the fibres, water is added to the stock from time to time to prevent the temperature from substantially exceeding 300° F. Approximately 25 to 30 lbs. of water for each 100 lbs. of stock will generally suffice to maintain the temperature in the apparatus below the scorching point, although this amount may vary with different grades of rubber stock and different forms of apparatus in which the stock is treated. The added water is subjected in the apparatus to the generated heat and forms steam which, together with the water, is intimately mixed with the mass, the steam tending to accelerate the action of the apparatus in plasticizing the rubber and breaking down its physical structure so that it may be revulcanized.

The apparatus in which I prefer to carry on the treatment is that commercially known as the Banbury mixer, one form of the mixer being disclosed in Patent No. 1,523,387, dated January 20, 1925. The apparatus as disclosed in the patent includes a pair of cylindrical chambers arranged side by side and in communication, within which are mounted rotors, and both the walls of the chambers and the rotors are provided with means for water cooling or heating these parts, as desired. The material to be treated is introduced into the chambers and subjected to the pressure of a ram. The rotors are of such shape as to cause the material to be crushed, rolled, and kneaded, and the material is rubbed or smeared along the walls of the chambers by the rotor action. In addition, the material is broken up into pieces which are rubbed against and upon one another by the action of the rotors, and the result is that the pieces are disintegrated and fibrous material in the form, for example, of fabric or cords, present in the pieces, is disintegrated and torn apart. As the operation proceeds to the point where the mass coheres, the rotors operate with a kneading action, which causes the mass to become homogeneous and the fibres to be substantially uniformly distributed therethrough.

The operations described can be carried on in a relatively short time, and scraps of certain materials can be reclaimed in a fraction of the time required for carrying out prior practices. Also, the resulting product is superior to that previously produced in that the quality of the rubber is not degraded, and in the case of fibre-bearing materials, the final product contains reinforcing fibres which contribute greatly to its cohesion.

I claim:

1. A method of reclaiming vulcanized rubber scrap, which comprises reducing the scrap to a mass of relatively small pieces, maintaining the pieces of said mass in close contact with one another and subjecting them to mechanical action in an internal mixer during which they are rubbed upon one another at an elevated temperature produced by the action, adding a relatively small quantity of water to the mass, and continuing the mechanical treatment with at least part of the water forming steam until the scrap is converted into a homogeneous plastic mass.

2. A method of reclaiming vulcanized rubber scrap which comprises reducing the scrap to a mass of relatively small pieces, maintaining the pieces of said mass in close contact with one another and subjecting them to mechanical action in an internal mixer during which they are rolled, crushed, and rubbed upon one another and reduced to small particles, adding a relatively small quantity of water to the mass, and continuing the mechanical treatment in the presence of steam generated from the water until the particles are converted into a softened material capable of being sheeted.

3. A method of reclaiming vulcanized rubber scrap, which comprises maintaining a mass of small pieces of the scrap in close contact, subjecting the pieces of said mass to mechanical action in an internal mixer during which they are rubbed upon one another, continuing the treatment until the pieces have been reduced to small particles, and thereafter continuing the treatment until the particles have cohered into a softened devulcanized material capable of being sheeted, while limiting the temperature of the body of material undergoing treatment by additions of water in relatively small amounts, which generates steam.

4. A method of reclaiming vulcanized rubber scrap, which comprises maintaining a mass of small pieces of rubber scrap in close contact, subjecting the pieces of said mass to mechanical action in an internal mixer during which they are rubbed upon one another and reduced to small particles, adding a small quantity of an agent capable of softening rubber, and continuing the mechanical action until the particles have cohered into a plastic mass, while adding water in small amounts from time to time to generate steam.

5. The method of reclaiming vulcanized rubber scrap, which comprises subjecting a mass of pieces of rubber scrap to intense mechanical action in an internal mixer while said mass is in the presence of an agent from the class consisting of water and steam and is confined under mechanical pressure sufficient to induce heat within the particles by distortion of the particles and frictional heat between the particles until softening takes place.

6. The method of reclaiming vulcanized rubber scrap, which comprises subjecting a mass of pieces of rubber scrap to intense mechanical action in an internal mixer while said mass is in the presence of an agent from the class consisting of water and steam and is confined under mechanical pressure sufficient to induce heat within the particles by distortion of the particles and frictional heat between the particles until softening takes place, and thereafter, and before removal from the zone of intense mechanical action, adding an amount of water sufficient to prevent substantial oxidation of the resulting product.

THOMAS ROBINSON.